(12) United States Patent
McCoy et al.

(10) Patent No.: US 7,785,158 B1
(45) Date of Patent: Aug. 31, 2010

(54) ELECTRODE CONNECTION PLATFORM

(75) Inventors: David F. McCoy, Rosendale, WI (US); Steven J. Gonring, Slinger, WI (US)

(73) Assignee: Brunswick Corporation, Lake Forest, IL (US)

( * ) Notice: Subject to any disclaimer, the term of this patent is extended or adjusted under 35 U.S.C. 154(b) by 43 days.

(21) Appl. No.: 11/948,449

(22) Filed: Nov. 30, 2007

(51) Int. Cl.
*H01R 11/11* (2006.01)
(52) U.S. Cl. .................................. 439/798; 439/627
(58) Field of Classification Search .............. 439/798, 439/797, 626, 627
See application file for complete search history.

(56) References Cited

U.S. PATENT DOCUMENTS

| | | | | |
|---|---|---|---|---|
| 1,460,604 A | * | 7/1923 | Potter | 439/627 |
| 3,725,851 A | * | 4/1973 | Linn | 439/798 |
| 4,294,505 A | | 10/1981 | Gaffney | |
| 5,173,060 A | * | 12/1992 | Shimirak et al. | 439/416 |
| 5,629,106 A | | 5/1997 | Yamada et al. | |
| 5,658,684 A | | 8/1997 | Lake | |
| 6,036,554 A | * | 3/2000 | Koeda et al. | 439/797 |
| 6,319,628 B1 | | 11/2001 | Zama | |
| 6,517,390 B2 | | 2/2003 | Kim | |
| 6,884,123 B2 | | 4/2005 | Kim | |
| 7,473,147 B2 | * | 1/2009 | Zahnen | 439/798 |
| 2006/0160422 A1 | | 7/2006 | Bang et al. | |
| 2007/0154793 A1 | | 7/2007 | Bang et al. | |
| 2008/0026645 A1 | * | 1/2008 | Naufel et al. | 439/798 |

* cited by examiner

*Primary Examiner*—Hien Vu
(74) *Attorney, Agent, or Firm*—William D. Lanyi

(57) ABSTRACT

An electrode connection platform is made of an electrically conductive material, such as brass, and configured to allow multiple electrical conductors to be rigidly and securely attached to its upper surfaces. The platform is attachable to a terminal of a storage battery. Upper surfaces of the platform are arranged so that interference between electrical conductors is minimized. The platform, with all of its attached electrical conductors, can be removed from a terminal post of a storage battery without necessitating the disconnection of any of the electrical conductors from the platform.

8 Claims, 3 Drawing Sheets

ELECTRODE CONNECTION PLATFORM

BACKGROUND OF THE INVENTION

1. Field of the Invention

The present invention is generally related to a battery connection platform and, more particularly, to an electrically conductive and generally rigid platform that facilitates the connection of numerous wires and conductors to the electrodes of a storage battery.

2. Description of the Related Art

When electrical storage batteries are used, electrical conductors or wires are connected to the positive and negative terminals of the battery in order to provide power to electrical equipment such as starter motors and other devices. When the number of auxiliary devices used in conjunction with the storage battery increases, is all of those devices must be securely connected in electrical communication with the positive and negative terminals of the storage battery. This can possibly result in a disorganized clutter of wires and other conductors in the vicinity of the battery terminals. This, in turn, can result in an unsafe condition and circumstances in which it becomes difficult to disconnect and reconnect various conductors from the battery. In addition, regulations promulgated by the American Boat & Yacht Council require that no more than four conductors be secured to any one terminal stud of a battery. This regulation states that, if additional connections are necessary, two or more terminal studs must be connected together by means of jumpers or copper straps.

U.S. Pat. No. 4,294,505, which issued to Gaffney on Oct. 13, 1981, describes a terminal connector for an electrical storage battery. It comprises an electrically insulating body having a bore therein arranged to receive a battery terminal post. Mounted in the body for movement relative thereto, is an operating member which carries a conductive element to which an electrical cable is secured. The operating member is movable relative to the body, while the body remains stationary, to move the conductive element and/or the electrical cable relative to the bore in the body and into and out of electrical contact with a battery terminal post received in the bore in use.

U.S. Pat. No. 5,629,106, which issued to Yamada et al. on May 13, 1997, describes a connection structure and connection fitting for an electrode post of a battery. It includes a lock stage portion formed on a circumference of the electrode post, a tapered portion formed at a top portion of the electrode post, a lock spring inserted in the connection fitting so as to engage with the lock stage portion to thereby lock the electrode post and the connection fitting with each other, and a hollow elastic body accommodated in the connection fitting so as to press the connection conductor to thereby connect the electrode post and the connection conductor to each other.

U.S. Pat. No. 5,658,684, which issued to Lake on Aug. 19, 1997, describes a battery having orifices for connection with electrodes terminals. This patent describes a method of forming a battery which includes providing a cathode base which comprises a first non-conductive surface, a first conductive layer superjacent the first non-conductive surface, the first conductive layer comprising a first area, and a cathode layer superjacent the first conductive layer leaving at least a portion of the first area exposed. The method also includes the step of providing an anode base which comprises a second non-conductive surface, a second conductive layer superjacent the first non-conductive surface, the second conductive layer comprising a second area and an anode layer superjacent the second conductive layer leaving at least a portion of the second area exposed, the anode layer comprising an alkali metal.

U.S. Pat. No. 6,319,628, which issued to Zama on Nov. 20, 2001, describes a secondary battery with plural electrode terminals connected through one collecting terminal. The secondary battery includes a case for accommodating an electrode element therein and a conductive lid element for closing an open end of the case. A plurality of electrode terminals extend from the top and bottom of the electrode element. The plurality of electrode terminals extending from the top of the electrode element are electrically connected to one end of a collecting terminal with a metallic grommet.

U.S. Pat. No. 6,517,390, which issued to Kim on Feb. 11, 2003, describes a connecting terminal for a storage battery. A connecting terminal part connecting to a post terminal for a storage battery is provided and connection terminals for fixing a wire connector are made attachable or detachable by means of bolts in conjunction with washers and the insertion holes of the connecting terminal part are tightened with appropriate tightening force by means of a tightening bolt having a screw thread only at the portion at its lower end which incorporates into a unit a rubber cap in the shape of a band which covers the upper and lower portions of the connecting terminal part connected to the post terminal and which has protrusions in the shape of a ring, respectively, around the rim of the bottom side of the piercing hole of the rubber cap which is bored into the portion corresponding to the insertion hole of the lower end of the connecting terminal part.

U.S. Pat. No. 6,884,123, which issued to Kim on Apr. 26, 2005, describes a connecting terminal for a storage battery. The connecting terminal includes a fixation plate having a bolt hole extending therethrough, a fixation member insertable into the bolt hole of the fixation plate, a rounded insertion member extending from the fixation plate and having upper and lower elastic bodies defining an insertion hole, the upper and lower elastic bodies each having flanged portions extending toward one another and a tightening member extending from the insertion member.

U.S. patent application Ser. No. 11/285,418, which was filed on Nov. 22, 2005 by Bang et al., describes an electrode connector containing plate and battery module employed with the same. It includes a conductive wire and plates mounted on the wire so that the plates can be electrically connected to electrodes of cells. The plates are electrically connected to the wire. A battery module is manufactured with the electrode connector. The electrode connector is electrically connected to the electrodes of the cells by means of the plates.

U.S. patent application Ser. No. 11/566,498, which was filed on Dec. 4, 2006 by Bang et al., describes an electrode connector containing plate and battery module employed with the same. It includes a conductive wire and a plurality of plates mounted on the wire such that the plates can be electrically connected to electrodes of cells, wherein the plates are electrically connected to the wire in a structure in which the plates are coupled to the wire by clamping.

The patents described above are hereby expressly incorporated by reference in the description of the present invention.

It would be significantly beneficial if a device could be provided which securely and rigidly attaches a plurality of conductors in electrical communication with the terminal posts, or electrodes, of a storage battery. It would also be significantly beneficial if all of the conductors could remain attached to each other when they are simultaneously removed from electrical contact with the terminal posts of a battery during, for example, the process of removing a battery and replacing it with a new battery. It would also be significantly beneficial if the device described above could facilitate the electrical connection of a relatively large plurality of conductors to a single terminal post, or electrode, of a storage battery.

SUMMARY OF THE INVENTION

An electrode connection platform, made in accordance with a preferred embodiment of the present invention, comprises an electrically conductive member, an opening extending through the electrically conductive member and shaped to receive an electrode, a first connection device configured to attach a first electrical wire in electrical communication with the electrically conductive member and a second connection device configured to attached a second electrical wire in electrical communication with the electrically conductive member. The first and second connection devices comprise first and second holes extending through first and second planar surfaces of the electrode connection platform in a preferred embodiment of the present invention. In certain embodiments of the present invention, the first and second planar surfaces are non-coplanar with each other. The first and second planar surfaces are parallel with each other in certain preferred embodiments of the present invention. The first and second connection devices can comprise first and second pluralities of threaded holes extending through the first and second planar surfaces, respectively, of the electrode connection platform. The first and second planar surfaces can be parallel with each other. The electrode can be a terminal of a storage battery and the platform can be made of a non-ferrous material.

BRIEF DESCRIPTION OF THE DRAWINGS

The present invention will be more fully and clearly understood from a reading of the description of the preferred embodiment of the present invention in conjunction with the drawings, in which.

DESCRIPTION OF THE PREFERRED EMBODIMENT

Figure 1:
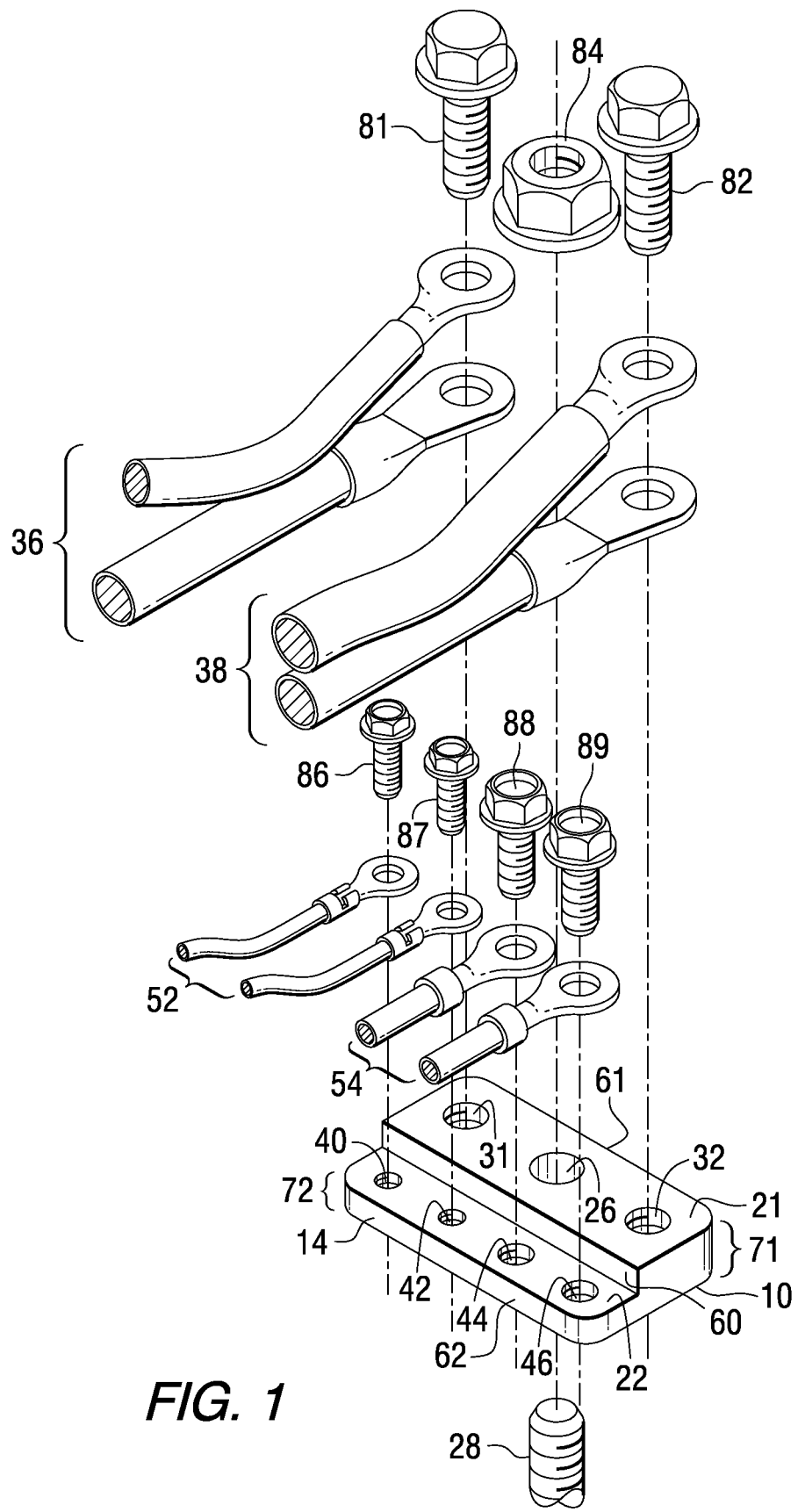
FIG. 1 is an exploded view of a preferred embodiment of the present invention associated with multiple electrical conductors and associated hardware.

Throughout the description of the preferred embodiment of the present invention, like components will be identified by like reference numerals.

FIG. 1 is an exploded view which shows the electrode connection platform 10 of the present invention associated with various electrical conductors and hardware that is used to rigidly attach the conductors to the platform 10. In a preferred embodiment of the present invention the electrode connection platform 10 comprises an electrically conductive plate 14 having first and second surfaces, 21 and 22. It also comprises an opening 26 that extends through the electrically conductive plate 10. The opening 26 is shaped to receive an electrode 28 of a storage battery. A first set of connectors, which comprises threaded holes 31 and 32, is configured to attach a first set of electrical conductors, 36 and 38, in electrical communication with the electrically conductive plate 10. In a preferred embodiment of the present invention, a second set of connectors, 40, 42, 44, and 46, is configured to attach a second set of conductors, 52 and 54, in electrical communication with the electrically conductive plate 10.

With continued reference to FIG. 1, the first set of connectors, 31 and 32, comprises a first set of threaded holes which extend through the first surface 21 of the electrode connection platform. The second set of connectors, 40, 42, 44, and 46, comprises a second set of threaded holes which extend through the second surface 22 of the electrode connection platform.

With continued reference to FIG. 1, it can be seen that, in the illustrated embodiment, the first and second surfaces, 21 and 22, are generally planar and generally parallel with each other. The first and second surfaces, 21 and 22, in the embodiment shown in FIG. 1 are not coplanar with each other as illustrated by the step 60 between the two surfaces. The electrode connection platform 10 comprises a first portion 61 having a first thickness 71, wherein the first surface 21 is a surface of the first portion 61. In addition, the electrode connection platform 10 comprises a second portion 62 having a second thickness 72. The second surface 22 is a surface of the second portion 62 and the first thickness 71 is greater than the second thickness 72.

With continued reference to FIG. 1, various threaded components are provided to rigidly and securely attach the electrical connectors to the electrode connection platform 10. For example, threaded bolt 81 attaches electrical conductors 36 to threaded hole 31 of the connection platform 10. Bolt 82 similarly connects electrical conductors 38 to threaded hole 32. The nut identified by reference numeral 84 attaches to the threaded electrode 28 of a storage battery which extends through hole 26. Nut 84 rigidly attaches the electrically conductive plate 10 to the electrode 28. Bolts 86 and 87 attach electrical conductors 52 to threaded holes 40 and 42, respectively. Similarly, threaded bolts 88 and 89 attach electrical conductors 54 to threaded holes 44 and 46, respectively.

Although the present invention is not limited to particular sizes of conductors, connectors, bolts, and nuts, certain particularly preferred embodiments of the present invention incorporate certain common sizes of these components. As an example, the positive terminal of a storage battery is typically 5/16 inches in diameter. Therefore, the electrically conductive plate 10 would typically be provided with a hole 26 which is shaped to receive a stud 28 of that size. On the other hand, the plate 10 intended for use with a negative terminal post 28 of a battery would incorporate a hole 26 that is shaped to receive a threaded post that is 3/8 inches in diameter. In a preferred embodiment of the present invention, the platform 10 was designed to allow for both number 10 electrical lead eyelets as shown in conjunction with conductors 52 and 1/4 inch electrical lead eyelets as shown in conjunction with conductors 54. These sizes are typical of those used in conjunction with storage batteries in the marine industries. The platform 10, in a preferred embodiment of the present invention, also accommodates two 3/8 inch eyelets such as those associated with conductors 36 and 38 and with holes 31 and 32, respectively.

Figure 2:
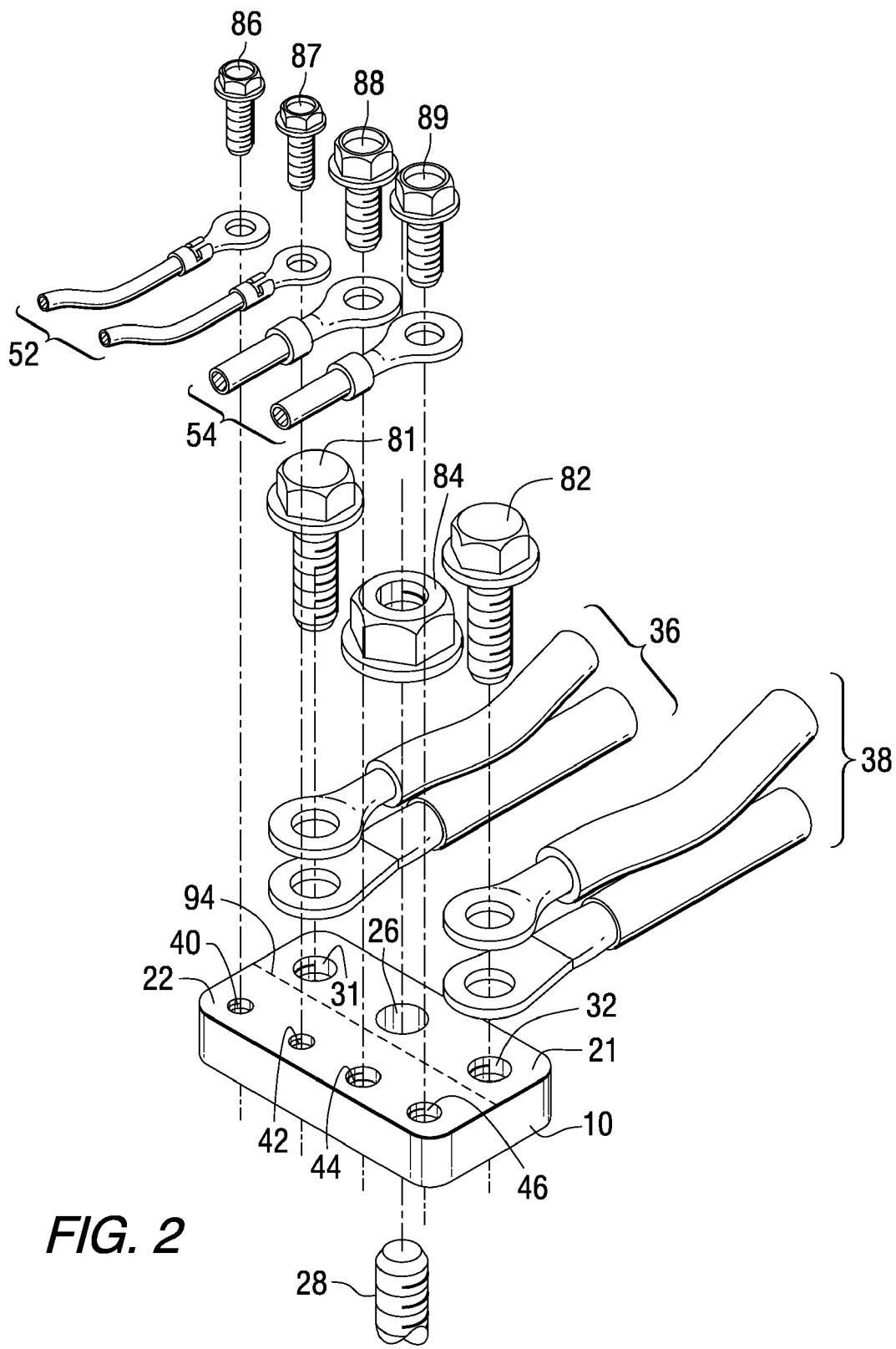
FIG. 2 is an alternative embodiment of the present invention shown as an exploded view.

FIG. 2 shows an alternative embodiment of the platform 10 of the present invention. In FIG. 2, dashed line 94 hypothetically divides the upper surface of the platform 10 into two surfaces, 21 and 22. Hole 26 and threaded holes 31 and 32 extend through the first surface 21 while threaded holes 40, 42, 44 and 46 extend through the second surface 22. In the alternative embodiment shown in FIG. 2, the first and second surfaces, 21 and 22, are coplanar with each other. Comparing FIGS. 1 and 2, it can be seen that no step 60 exists between the first and second surfaces in FIG. 2. To accommodate the coplanar nature of the first and second surfaces, 21 and 22, the conductors, 36 and 38, attach to the first surface 21 extend from the platform 10 in a first direction (i.e. toward the right in FIG. 2) while electrical conductors 52 and 54 are attached to the second surface 22 and extend in the opposite direction (i.e. toward the left in FIG. 2). The other hardware shown in FIG. 2 is generally identical to the corresponding hardware in FIG. 1 and will not be described in further detail herein.

Figure 3:
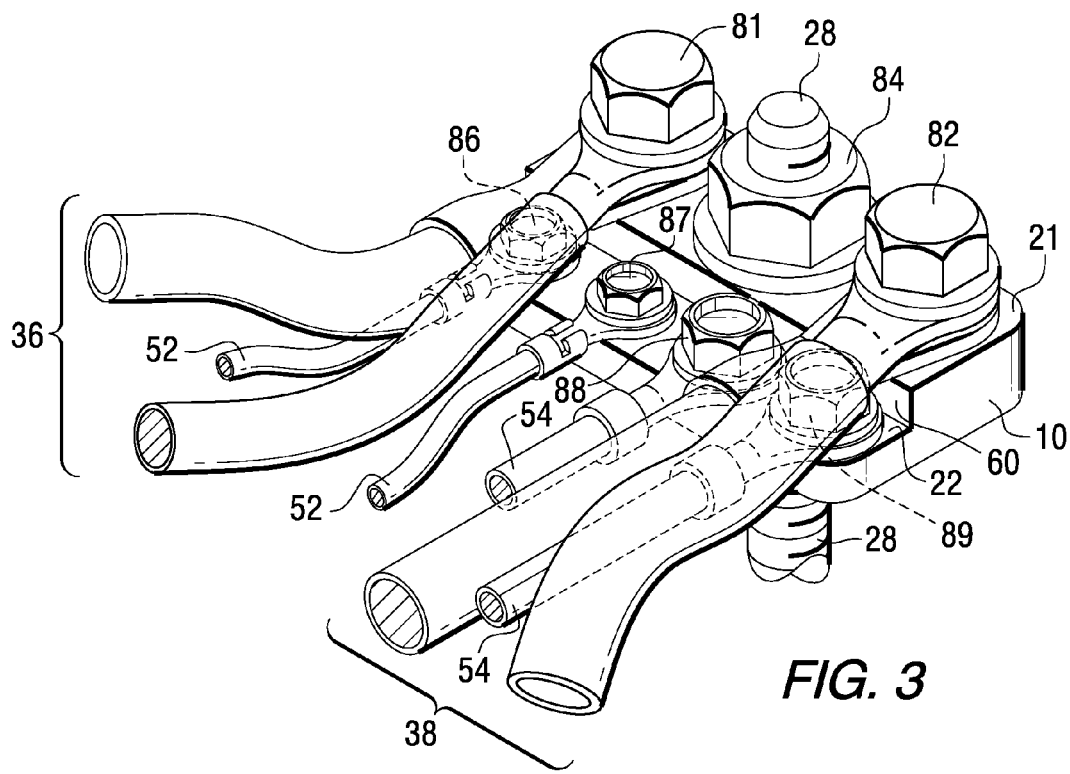
FIG. 3 is an isometric view of a preferred embodiment of the present invention attached to a plurality of electrical conductors and to a terminal post of a storage battery.

FIG. 3 is an isometric view showing all of the electrical conductors described above attached to the platform 10. In FIG. 3, it can be seen that the step 60, provided by the non-coplanar relationship between the first and second surfaces, 21 and 22, allows the larger conductors, 36 and 38, to pass over the bolts, 86-89, which attach the smaller conductors, 52 and 54, to the second surface 22. It should also be appreciated that, by loosening nut 84 and raising the platform 10 relative to the terminal post 28, the entire assembly can be removed from the battery without disconnecting any of the conductors shown in FIG. 3 from the platform 10. This facilitates the changing of the battery without having to disconnect any of the conductors from the platform. By simply removing the nut 84 at both electrodes of the battery, the two platforms (i.e. associated with the positive and negative terminals) can be raised in order to disconnect them from their associated terminal posts. The battery can then be changed and the two connection platforms can be reconnected to the terminal posts of the new battery.

With continued reference to FIG. 3, it should be understood that additional electrical conductors could be added to the assembly shown. Since current regulations allow a maximum of four conductors to be secured to any one terminal stud, each of the bolts, 86-89, could accommodate four electrical conductors. These electrical conductors could be rigidly and securely attached to the platform 10. Although spatial limitations and the physical sizes of the conductors can limit the number of electrical conductors that can be connected to any single terminal post 28, that limitation is not a function of the electrically conductive plate 10 but, instead, is a function of the physical space surrounding the terminal post 28 and the physical size of the various conductors.

Figure 4:
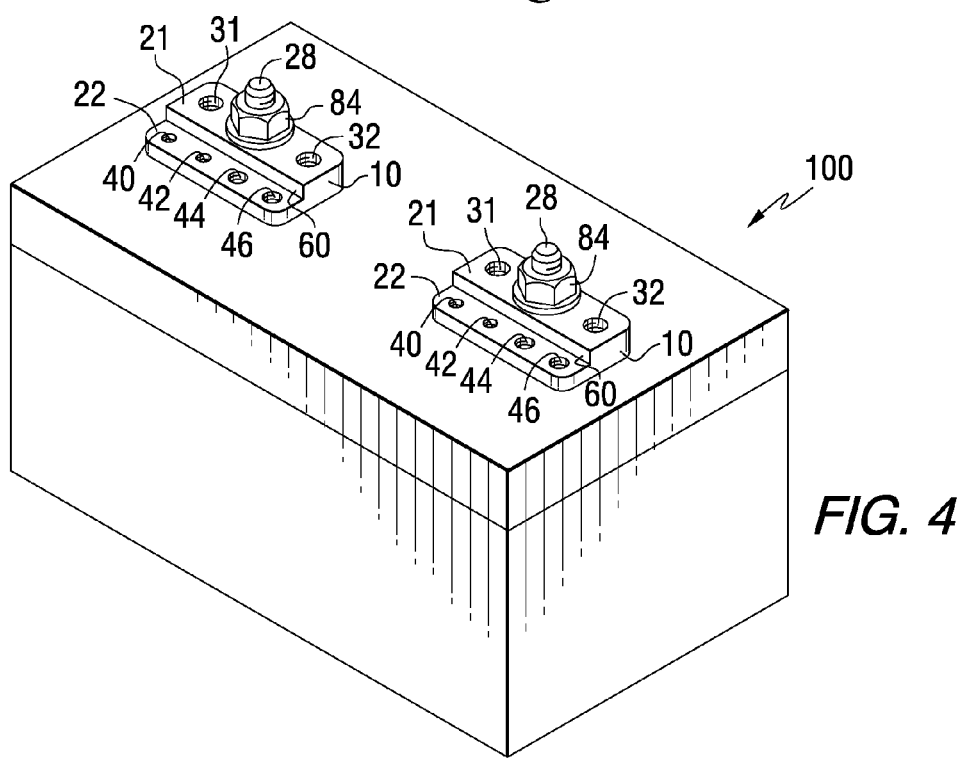
FIG. 4 shows a storage battery with two platforms made in accordance with a preferred embodiment of the present invention.

FIG. 4 illustrates a storage battery 100 with two terminal posts 28. Two electrically conductive plates 10 are rigidly attached to the terminal post 28 with nuts 84. No electrical conductors are illustrated in FIG. 4, such as the wires and cables described above in conjunction with FIGS. 1-3. FIG. 4 represents a stage of assembly following the attachment of the plates 10 to the terminal posts and prior to the attachment of the individual electrical conductors, such as those identified by reference numerals 36, 38, 52 and 54 in FIGS. 1-3. It can easily be envisioned that, after all of the electrical conductors are attached to their respective plates 10, a simple loosening of nuts 84 would allow the plates 10 and their attached electrical conductors to be lifted away from their associated terminal posts 28 so that the storage battery 100 can be replaced. This can therefore be done without attaching any of the electrical conductors from their associated plates 10.

With continued reference to FIGS. 1-4, it can be seen that various to embodiments of the present invention comprise an electrode connection platform which, in turn, comprises an electrically conductive plate 10 having first and second generally planar surfaces, 21 and 22, respectively. An opening 26 extends through the electrically conductive plate 10 and is shaped to receive an electrode 28 of a storage battery 100. A first set of threaded holes, 31 and 32, are configured is to attach a first set of electrical conductors, 36 and 38, in electrical communication with the electrically conductive plate 10. A second set of threaded holes, 40, 42, 44 and 46, are configured to attach a second set of electrical conductors, 52 and 54, in electrical communication with the electrically conductive plate 10.

With continued reference to FIGS. 1-4, the first set of threaded holes extend through the first generally planar surface 21 of the electrode connection platform 10 and the second set of threaded holes extends through the second generally planar surface 22 of the electrode connection platform 10. In a particularly preferred embodiment of the present invention, the first and second generally planar surfaces, 21 and 22, are parallel with each other. The electrode connection platform 10 comprises a first portion 61 having a first thickness 71 with the first generally planar surface 21 being a surface of the first portion 61. The electrode connection platform comprises a second portion 62 having a second thickness 72. The second generally planar surface 22 is a surface of the second portion 62 and the first thickness 71 is greater than the second thickness 72. The electrically conductive plate 10 is separable from the electrode 28 with the first and second sets of electrical conductors remaining connected to the first and second sets of threaded holes. The second set of electrical conductors, 52 and 54, are disposable between the first set of electrical conductors, 36 and 38, and the second generally planar surface 22 while the first and second sets of electrical conductors are attached to the electrically conductive plates.

Although the present invention has been described with particular specificity and illustrated to show a preferred embodiment, it should be understood that other embodiments are also within its scope.

We claim:

1. An electrode connection platform, comprising:
   an electrically conductive member;
   an opening extending through a middle section of said electrically conductive member, said opening being shaped to receive a threaded electrode of a battery;
   a first connection device configured to attach a first set of electrical wires in electrical communication with said electrically conductive member; and
   a second connection device configured to attach a second set of electrical wires in electrical communication with said electrically conductive member;
   wherein said first and second set of electrical wires extend in non-parallel relation to said electrode;
   wherein said electrode extends axially along an axial direction perpendicular to the electrically conductive member;
   said first connection device comprises a first plurality of threaded holes extending axially through a first planar surface of said electrode connection platform;
   said second connection device comprises a second plurality of threaded holes extending axially through a second planar surface of said electrode connection platform; and
   wherein the opening that received the electrode and the electrode are parallel with the threaded holes of the first and second connection devices.

2. The platform of claim 1, wherein:
   said first and second electrical wires extend laterally relative to said axial direction and normally to said axially extending electrode.

3. The platform of claim 1, wherein:
   said electrode is a terminal of the battery.

4. The platform of claim 1, wherein:
   said platform is made of a nonferrous material.

5. An electrode connection platform, comprising:

an electrically conductive plate having first and second surfaces;

an opening extending through a middle section of said electrically conductive plate, said opening being shaped to receive an electrode of a storage battery, said electrode extending axially along an axial direction perpendicular to the electrically conductive plate;

a first set of connectors configured to attach a first set of electrical conductors in electrical communication with said electrically conductive plate;

and a second set of connectors configured to attach a second set of electrical conductors in electrical communication with said electrically conductive plate;

wherein said first and second sets of electrical conductors extend laterally relative to said axial extension of said electrode;

wherein: said first set of connectors comprises a first set of threaded holes which extends axially through said first surface of said electrode connection platform;

said second set of connectors comprises a second set of threaded holes which extends axially through said second surface of said electrode connection platform; and wherein the opening that received the electrode and the electrode are parallel with the threaded holes of the first and second connection devices.

6. The platform of claim 5, wherein:

said first and second surfaces are generally planar and generally parallel with each other.

7. The platform of claim 6, wherein:

said electrode connection platform comprises a first portion having a first thickness, said first surface being a surface of said first portion; and said electrode connection platform comprises a second portion having a second thickness, said second surface being a surface of said second portion, said first thickness being greater than said second thickness.

8. The platform of claim 7, wherein:

said electrically conductive plate is separable from said electrode with said first and second sets of electrical conductors remaining connected to said first and second sets of connectors; and said second set of electrical conductors are disposable between said first set of electrical conductors and said second surface while said first and second sets of electrical conductors are attached to said electrically conductive plate.

\* \* \* \* \*